United States Patent
Nakamura et al.

(10) Patent No.: US 10,336,009 B2
(45) Date of Patent: Jul. 2, 2019

(54) THREE-DIMENSIONAL MODELING APPARATUS, THREE-DIMENSIONAL MODELING METHOD AND COMPUTER PROGRAM

(71) Applicant: SEIKO EPSON CORPORATION, Tokyo (JP)

(72) Inventors: Shinichi Nakamura, Nagano (JP); Hiroshi Wada, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 371 days.

(21) Appl. No.: 14/995,705

(22) Filed: Jan. 14, 2016

(65) Prior Publication Data

US 2016/0214326 A1   Jul. 28, 2016

(30) Foreign Application Priority Data

Jan. 22, 2015   (JP) .................................. 2015-010444
Sep. 17, 2015   (JP) .................................. 2015-183755

(51) Int. Cl.
| | |
|---|---|
| B29C 67/00 | (2017.01) |
| G05B 19/4099 | (2006.01) |
| H04N 1/405 | (2006.01) |
| B29C 64/112 | (2017.01) |
| B29C 64/386 | (2017.01) |
| B33Y 50/02 | (2015.01) |

(52) U.S. Cl.
CPC ........ *B29C 67/0088* (2013.01); *B29C 64/112* (2017.08); *B29C 64/386* (2017.08); *G05B 19/4099* (2013.01); *H04N 1/4057* (2013.01); *B33Y 50/02* (2014.12); *G05B 2219/35134* (2013.01); *G05B 2219/49007* (2013.01); *G05B 2219/49031* (2013.01); *Y02P 90/265* (2015.11)

(58) Field of Classification Search
CPC .................................................. B29C 67/0088
See application file for complete search history.

(56) References Cited

U.S. PATENT DOCUMENTS

| | | | |
|---|---|---|---|
| 2007/0007698 A1* | 1/2007 | Sano | ..................... B29C 64/165 |
| | | | 264/496 |
| 2013/0249989 A1* | 9/2013 | Iguchi | ....................... B41J 2/07 |
| | | | 347/15 |

FOREIGN PATENT DOCUMENTS

| | | |
|---|---|---|
| JP | 2009-012413 A | 1/2009 |
| JP | 2011-079231 A | 4/2011 |
| JP | 4888257 B2 | 2/2012 |
| JP | 2013-010292 A | 1/2013 |
| JP | 2013-067121 A | 4/2013 |

\* cited by examiner

*Primary Examiner* — Tejal Gami

(57) ABSTRACT

The color of object data that indicates the shape and the color of an object is reproduced faithfully when modeling an object. A model is formed by discharging droplets having the same color from droplet discharging units onto a medium, based on the same reference signal. Colorimetry is performed on the model, and a first-portion and a second-portion having a color with a higher density are specified. The liquid amount of droplets per unit area to be discharged from droplets discharging units that formed the first-portion and the liquid amount of droplets per unit area to be discharged from droplets discharging units that formed the second-portion are adjusted such that a difference in density of colors to be reproduced decreases. The object is modeled by repeating processing for discharging droplets from the droplet discharging units based on the object data.

8 Claims, 9 Drawing Sheets

THREE-DIMENSIONAL MODELING APPARATUS, THREE-DIMENSIONAL MODELING METHOD AND COMPUTER PROGRAM

BACKGROUND

1. Technical Field

The present invention relates to a technique for modeling a three-dimensional object.

2. Related Art

Conventionally, there is a technique for modeling a three-dimensional object by repeating processing for discharging and curing droplets in continuous positions on a plane surface to form a plate-like member, and further forming a plate-like member thereon (JP-A-2009-12413). With such a technique, it is possible to provide a three-dimensional object with desired colors by supplying droplets of the colors C (cyan), M (magenta), and Y (yellow) at appropriate proportions.

However, there are cases where the colors in object data representing the shape and the colors of an object cannot be faithfully reproduced due to variation in the liquid amount of droplets or variation in the landing position of droplets when modeling the object.

SUMMARY

An advantage of some aspects of the invention can be realized as embodiments or application examples that will be described below.

(1) According to one mode of the present invention, a three-dimensional modeling apparatus for modeling an object by discharging droplets is provided. This three-dimensional modeling apparatus includes: a plurality of droplet discharging units capable of individually discharging droplets; a supporting unit that supports a structure made of the droplets; a scan unit capable of moving the plurality of droplet discharging units relative to the supporting unit in a first direction intersecting a discharging direction of the droplets and in a second direction intersecting the discharging direction of the droplets and the first direction; and a control unit that controls the droplet discharging units, the supporting unit, and the scan unit. The control unit includes: a model forming unit that forms a model by discharging droplets having the same predetermined color from the plurality of droplet discharging units based on the same reference signal; a colorimetry unit that performs colorimetry of the model and specifies a first portion of the model and a second portion of the model that has a color with a higher density than the first portion; an adjustment unit that adjusts at least one of the liquid amount of droplets per unit area to be discharged from, among the plurality of droplet discharging units, a first type droplet discharging unit that formed the first portion, and the liquid amount of droplets per unit area to be discharged from, among the plurality of droplet discharging units, a second type droplet discharging unit that formed the second portion, such that a difference in density of colors to be reproduced by the first type and the second type droplet discharging units decreases; and a modeling unit that models the object by repeating processing for discharging droplets from the plurality of droplet discharging units based on object data that indicates the shape and the color of the object and forming a plate-like structure to newly form the plate-like structure on a plate-like structure that has already been formed.

If such an aspect is adopted, an object can be modeled while faithfully reproducing the colors of object data that indicates the shape and the colors of the object.

The plate-like structure does not need to be made of droplets only. That is, the plate-like structure may be made of droplets and other components. In addition, the plate-like structure may be made of droplets that have changed into another substance by reacting with another component or being independently modified.

(2) In the three-dimensional modeling apparatus of the above mode, an aspect can be adopted in which the adjustment unit adjusts, prior to modeling of the object, at least one of a signal that is to be supplied to the first type droplet discharging unit and is for discharging one droplet and a signal that is to be supplied to the second type droplet discharging unit and is for discharging one droplet, such that a difference in discharged amount between the one droplet from the first type droplet discharging unit and the one droplet from the second type droplet discharging unit decreases. If such an aspect is adopted, the colors of object data can be faithfully reproduced for a minute area by adjusting the liquid amount of one droplet discharged from each of the droplet discharging units.

(3) In the three-dimensional modeling apparatus of the above mode, an aspect can be adopted in which the adjustment unit adjusts the signal that is to be supplied to the second type droplet discharging unit in processing for modeling the object and is for discharging one droplet, so as to discharge one droplet of a smaller amount. If such an aspect is adopted, it is possible to reduce a difference in discharged amount between one droplet from the first type droplet discharging unit and one droplet from the second type droplet discharging unit while making use of the capacity of the first type droplet discharging unit.

(4) In the three-dimensional modeling apparatus of the above mode, an aspect can be adopted in which the adjustment unit adjusts, in the case where the same density is designated, at least one of a discharge ratio indicating the proportion of droplets to be discharged from the first type droplet discharging unit and a discharge ratio indicating the proportion of droplets that correspond to the droplets to be discharged from the first type droplet discharging unit and are to be discharged from the second type droplet discharging unit, such that a difference in density of colors to be reproduced by the first type and second type droplet discharging units decreases. If such an aspect is adopted, it is possible to model an object while faithfully reproducing the color of object data that indicates the shape and the color of the object, without changing the drive signal to be supplied to the first type and second type droplet discharging units.

(5) In the three-dimensional modeling apparatus of the above mode, an aspect can be adopted in which the modeling unit forms the plate-like structure having the shape of a cross section of the object, by discharging droplets from the plurality of droplet discharging units, based on cross sectional data generated from the object data and indicating the shape of the cross section and the color of the periphery of the cross section; and forms and stacks a plurality of the plate-like structures by repeating processing for forming the plate-like structure, for a plurality of respectively different cross sections of the object that are aligned in a direction perpendicular to the cross section. An aspect can be adopted in which the processing for forming the plate-like structure includes: processing for forming a first structure portion including the periphery of the cross section by discharging droplets from the plurality of droplet discharging units in accordance with the adjustment, and processing for forming a second structure portion surrounded by the first portion of the cross section by discharging droplets that do not have the predetermined color from another plurality of droplet discharging units different from the plurality of droplet discharging units. If such an aspect is adopted, the periphery of an object can be modeled while faithfully reproducing the color of the object data. Meanwhile, the inner portion of the object can be suitably modeled in accordance with a request different from a request for color accuracy.

(6) According to another mode of the present invention, a method for modeling an object by discharging droplets is provided. This method includes the steps of: (a) forming a model by discharging droplets having the same predetermined color from a plurality of droplet discharging units based on the same reference signal; (b) performing colorimetry of the model and specifying a first portion of the model and a second portion of the model that has a color with a higher density than the first portion; (c) adjusting at least one of the liquid amount of droplets per unit area to be discharged from, among the plurality of droplet discharging units, a first type droplet discharging unit that formed the first portion, and the liquid amount of droplets per unit area to be discharged from, among the plurality of droplet discharging units, a second type droplet discharging unit that formed the second portion, such that a difference in density of colors to be reproduced by the first type and the second type droplet discharging units decreases; and (d) modeling the object by repeating processing for discharging droplets from the plurality of droplet discharging units based on object data that indicates the shape and the color of the object and forming a plate-like structure to newly form the plate-like structure on a plate-like structure that has already been formed.

Note that the step (c) may be executed before the step (d), or may be executed while executing the step (d).

Not all of the plurality of constituent components provided in the above-described modes of the invention are essential, and some of the plurality of constituent components may be modified, deleted, or replaced with other new constituent components, or the limitations may be partially removed as appropriate, in order to solve some or all of the problems described above, or to achieve some or all of the effects described in this specification. It is also possible to combine some or all of the technical features included in one of the above-described modes of the invention with some or all of the technical features included in another of the above-described modes of the invention to make an independent mode of the invention, in order to solve some or all of the problems described above, or to achieve some or all of the effects described in the specification.

The invention can be realized in various modes other than an apparatus. For example, the invention can be realized in modes such as a three-dimensional modeling method, a control method of a three-dimensional modeling apparatus, a computer program for realizing the control method, or a non-transitory recording medium that stores the computer program.

BRIEF DESCRIPTION OF THE DRAWINGS

The invention will be described with reference to the accompanying drawings, wherein like numbers reference like elements.

DESCRIPTION OF EXEMPLARY EMBODIMENTS

A. First Embodiment

Figure 1:
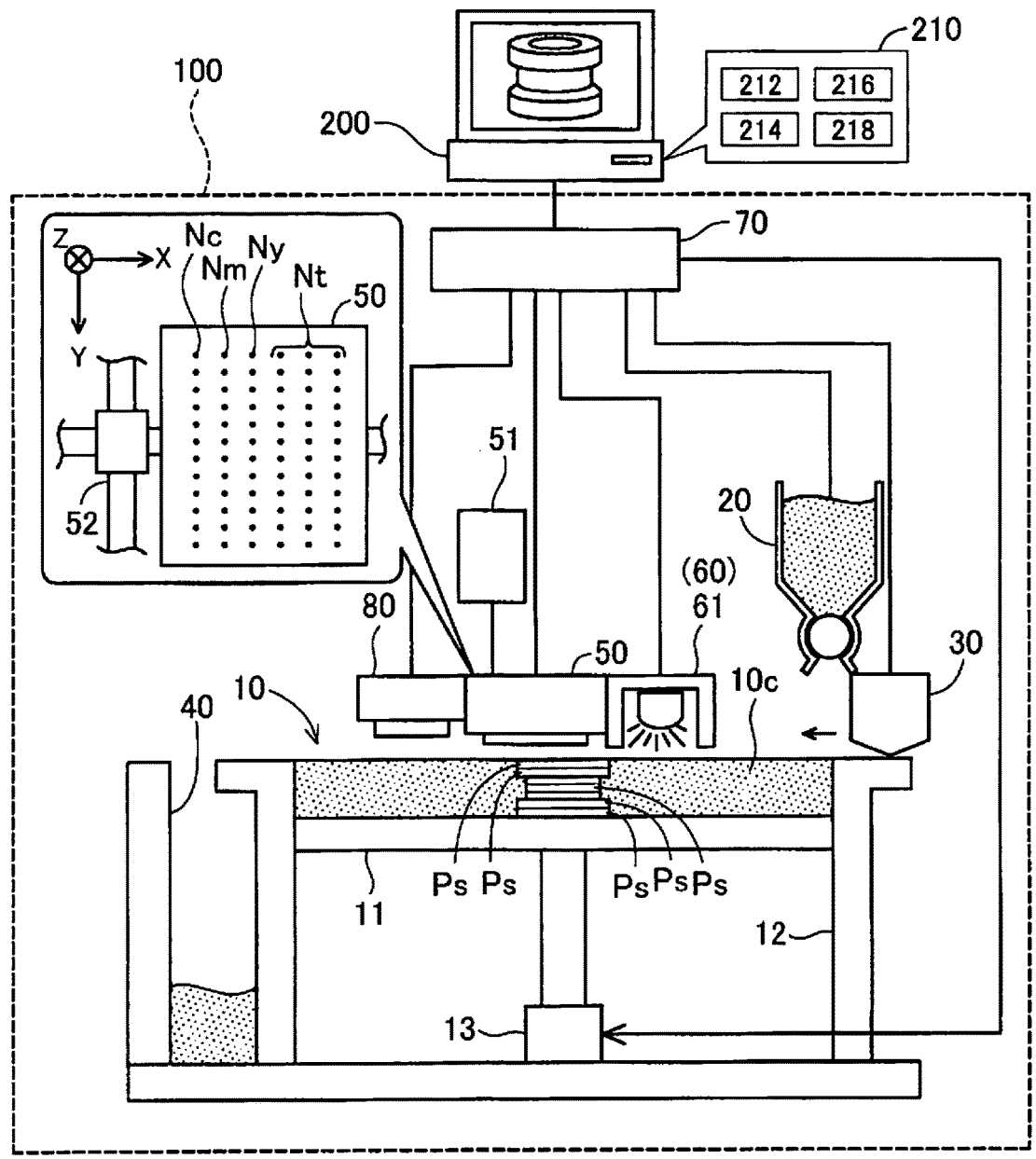
FIG. 1 is an explanatory diagram showing a schematic configuration of a three-dimensional modeling apparatus as a first embodiment of the present invention.

FIG. 1 is an explanatory diagram showing the schematic configuration of a three-dimensional modeling apparatus as the first embodiment of the present invention. A three-dimensional modeling apparatus 100 is provided with a modeling unit 10, a powder supply unit 20, a flattening mechanism 30, a powder collecting unit 40, the head unit 50, a curing energy applying unit 60, the control unit 70 and a colorimeter 80. A computer 200 is connected to the control unit 70. The three-dimensional modeling apparatus 100 and the computer 200 can be collectively regarded as a "three-dimensional modeling apparatus" in a broad sense.

FIG. 1 shows an X direction, a Y direction and a Z direction that intersect orthogonally to one another. The Z direction is a direction along a vertical direction, the X direction is a direction along a horizontal direction. The Y direction is a direction perpendicular to the Z direction and the X direction.

The modeling unit 10 is a configuration that includes a container 10c having an opening on the top face, and is for modeling a three-dimensional object inside the container 10c. The modeling unit 10 is provided with a modeling stage 11 having a flat top face in an XY direction, a frame body 12 surrounding the periphery of the modeling stage 11 and erect in the Z direction, and an actuator 13 for moving the modeling stage 11 in the Z direction. The container 10c is constituted by the modeling stage 11 that makes up a bottom face, and the frame body 12 that makes up side faces. The control unit 70 controls the operations of the actuator 13, and thereby the modeling stage 11 can be moved in the Z direction in the frame body 12. A material for making up the three-dimensional object is supplied to the container 10c. In the first embodiment, a liquid having photocurability (hereinafter, referred to as "curable liquid"), and a powder are used as materials of the three-dimensional object.

The powder supply unit 20 is an apparatus for supplying powder as a material that makes up a three-dimensional object into the container 10c constituted by the modeling stage 11 and the frame body 12. The powder supply unit 20 is constituted by a hopper or a dispenser, for example.

The flattening mechanism 30 flattens the top surface of the powder in the container 10c and forms a powder layer on the modeling stage 11 by moving the top surface powder in the container 10c in the horizontal direction (XY directions). The flattening mechanism 30 is constituted by a squeegee (spatula) or a roller, for example. The powder pushed out from the top surface of the powder in the container 10c by the flattening mechanism 30 is discharged into the powder collecting unit 40 provided adjacent to the container 10c.

A curable liquid for making up the three-dimensional object is a mixture of a liquid resin material and a polymerization initiator. The liquid resin material is mainly composed of monomers and oligomers to which monomers are bonded. As the monomers of the resin material, relatively low molecular weight monomers are selected. The number of monomers included in one oligomer of the resin material is adjusted to be about a few molecules. Because the monomers and the oligomers are adjusted in this manner, the curable liquid has a low viscosity that allows droplets to be discharged from the head unit 50.

The polymerization initiator enters an excited state when irradiated with ultraviolet light, and acts on the monomers or the oligomers so as to start polymerization. When the curable liquid is irradiated with ultraviolet light and the polymerization initiator is in an excited state, the monomers of the resin material polymerize with one another and grow into oligomers, and the oligomers also polymerize with one another in places. As a result, the curable liquid quickly cures and becomes a solid.

A polymerization initiator of a different type from that contained in the curable liquid is attached to the surface of the powder particles as a material for making up the three-dimensional object. The polymerization initiator attached to the surface of the powder particles has a property of acting on the monomers or the oligomers in the curable liquid so as to start polymerization when coming into contact with the curable liquid. Therefore, when the curable liquid is supplied to the powder in the container 10c, the curable liquid permeates into the powder, the curable liquid comes into contact with the polymerization initiator on the surface of the powder particles, and the curable liquid cures. As a result, in a portion onto which the curable liquid is discharged, powder particles are coupled with one another by the curable liquid that has cured. Note that in the case of using powder particles having a polymerization initiator attached to the surfaces thereof, a curable liquid that does not contain a polymerization initiator can also be used.

The head unit 50 of this embodiment is a so-called piezoelectric drive type droplet discharging head. The head unit 50 receives supply of the above-described curable liquid from a tank 51 connected to the head unit 50. The control unit 70 can adjust the amount of the curable liquid per droplet to be discharged from the nozzle provided on the head unit 50 by controlling the waveform of a voltage of a signal to be applied to the piezoelectric element.

The curable liquids to be supplied to the head unit 50 include a curable liquid having a color of cyan, magenta, or yellow, and a curable liquid without a color. The head unit 50 is provided with a nozzle array of nozzles Nc for discharging droplets of the curable liquid with a color of cyan, a nozzle array of nozzles Nm for discharging droplets of the curable liquid with a color of magenta, a nozzle array of nozzles Ny for discharging droplets of the curable liquid with a color of yellow, and a nozzle array of nozzles Nt for discharging droplets of the colorless curable liquid. The number of the nozzles Nc, the number of the nozzles Nm, and the number of the nozzles Ny are equal to one another. The number of the nozzles Nt is equal to the total number of the nozzles Nc, Nm, and Ny.

The nozzles of each nozzle array are arranged in the Y direction. The arrays of the nozzles Nc, Nm, Ny, and Nt are aligned and arranged in the X direction. A portion of the three-dimensional object that is formed by coupling the powder particles with one or more colored curable liquids has colors that are in accordance with the colors of the one or more curable liquids that are used. Hereinafter, colors of cyan, magenta, and yellow that are applied to the curable liquids may be referred to as "ink colors".

The head unit 50 can be moved in the X direction and the Y direction with respect to the container 10c (the modeling stage 11) by the scanning unit 52. Movement of the head unit 50 by the scanning unit 52 is also called "scanning". By the modeling stage 11 in the modeling unit 10 moving in the Z direction, the head unit 50 can be moved in the Z direction relative to the container 10c and the three-dimensional object in the container 10c.

The curing energy applying unit 60 is an apparatus for applying energy for curing a curable liquid to the curable liquid discharged from the head unit 50. In this embodiment, the curing energy applying unit 60 is a light emitting apparatus 61. Ultraviolet rays as curing energy for curing the curable liquid are emitted from the light emitting apparatus 61.

The curing energy applying unit 60 is fixed to the head unit 50 in a position aligned with the head unit 50 in the X direction. When the head unit 50 is moved by the scanning unit 52, the curing energy applying unit 60 (the light emitting apparatus 61) also moves with the head unit 50.

The colorimeter 80 is a colorimetry sensor that can measure the color of a targeted object arranged on the modeling stage 11. In this embodiment, the colorimeter 80 is fixed to the head unit 50 on the opposite side to the curing energy applying unit 60 in the X direction so as to sandwich the head unit 50. The colorimeter 80 can also be moved with respect to the modeling stage 11 in the X direction and the Y direction by the scanning unit 52. A CPU 210 of the computer 200 can measure the color of the targeted object at positions on the modeling stage 11 by using the colorimeter 80 via the control unit 70.

The control unit 70 controls the actuator 13, the powder supply unit 20, the flattening mechanism 30, the head unit 50, the curing energy applying unit 60, and the colorimeter 80 in accordance with instructions from the CPU 210 of the computer 200. The control unit 70 can model a three-dimensional object in the container 10c by controlling the units of the three-dimensional modeling apparatus 100. The control unit 70 is provided with a CPU, a memory and a ROM. The CPU realizes a function of printing a model as described later, and a function of modeling the three-dimensional object by loading a computer program stored in the ROM to the memory and executing the program. Note that the computer 200 may be provided with these functions are provided in the control unit 70.

The computer 200 is provided with the CPU 210, a memory and a ROM. The CPU 21 realizes a function of generating cross sectional data that will be described later and a function of setting a drive signal for a piezoelectric element in accordance with a colorimetry result by loading a computer program stored in the ROM to the memory and executing the program. The CPU 210 also controls and operates the three-dimensional modeling apparatus 100 via the control unit 70.

Figure 2:
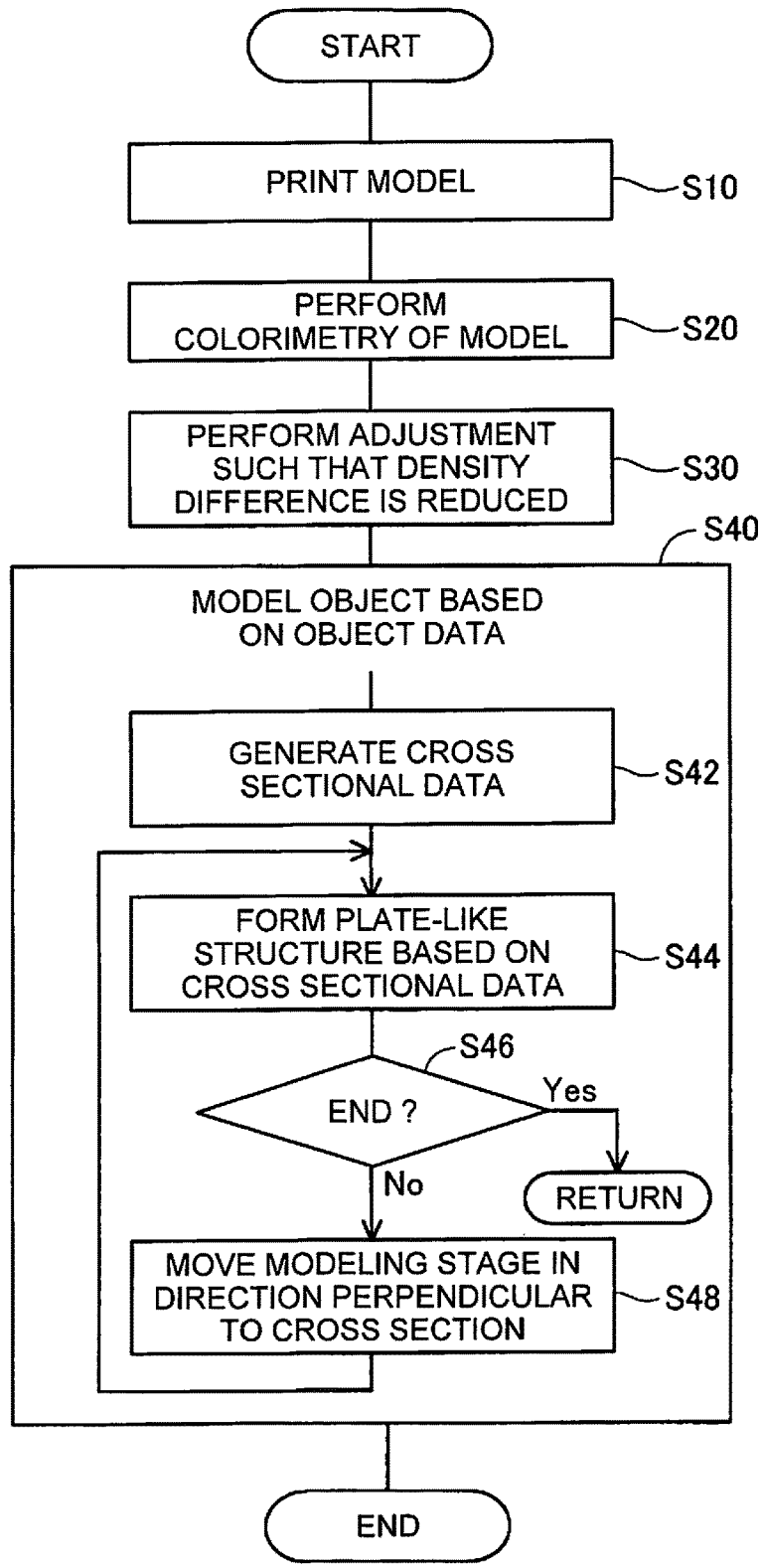
FIG. 2 is a flowchart for explaining processing for modeling a three-dimensional object according to the embodiment.

FIG. 2 is a flowchart for explaining processing for modeling the three-dimensional object according to this embodiment. In step S10, the CPU 210 of the computer 200 prints a model. More specifically, the CPU 210 controls the powder supply unit 20 and the flattening mechanism 30 via the control unit 70 of the three-dimensional modeling apparatus 100, and forms one powder layer in the container 10c. The CPU 210 then uses data for the model stored in the ROM of the computer 200 to drive piezoelectric elements of one nozzle array of the head unit 50 via the control unit 70, and discharge the curable liquid onto the powder layer. As a result, a model Pt0 is formed on the modeling stage 11 using the curable liquid of one color. The nozzle array that is used for forming the model Pt0 can be a nozzle array for discharging droplets of one of cyan, magenta, and yellow. In the forming of the model Pt0, the same reference signals are supplied to the piezoelectric elements corresponding to the nozzles.

In forming the model in step S10, so called pseudo band printing as described below is performed. The control unit 70 causes the head unit 50 to scan in the X direction via the scanning unit 52, while causing droplets to be discharged from the nozzles of one nozzle array arranged in the Y direction. At this time, the head unit 50 and the curing energy applying unit 60 are caused to scan such that the head unit 50 passes sites on the powder layer first, and subsequently, the curing energy applying unit 60 passes the sites. As a result, the curable liquid discharged from the head unit 50 onto the powder layer is then irradiated with ultraviolet rays by the curing energy applying unit 60 and cured.

Subsequently, the control unit 70 moves, via the scanning unit 52, the head unit 50 in the X direction to a position in which the head unit 50 was located before scanning in the X direction was started. The control unit 70 then causes, via the scanning unit 52, the head unit 50 to scan in the Y direction. The size of the scanning in the Y direction performed during the scanning in the X direction is 1/n (n is an integral number greater than or equal to two) of the pitch of the nozzles arranged in the Y direction. The control unit 70 then causes the head unit 50 to scan in the X direction again, while causing droplets to be discharged from the nozzles.

In this manner, the model Pt0 is printed on a printing medium by repeating the scanning in the X direction performed while discharging droplets and the scanning in the Y direction (n−1) times. A certain range in the Y direction (i.e. a range of the nozzle pitch) of the model Pt0 printed by such printing is printed with droplets discharged from the same nozzle. Note that a functional unit of the CPU 210 of the computer 200 for realizing the processing in step S10 is shown as a model forming unit 212 in FIG. 1.

In step S20 in FIG. 2, the CPU 210 uses the colorimeter 80 via the control unit 70 to perform colorimetry of the colors in positions of the model Pt0 formed in step S10. More specifically, the scanning unit 52 is used to cause the colorimeter 80 to scan in the X direction and the Y direction on the model Pt0, and causes the colorimeter 80 to perform colorimetry of the colors of positions of the model Pt0. The CPU 210 then specifies a reference portion R0 in which the density is in a reference density range including a reference density, a first portion R1 in which the density is lower than the reference density range, and a second portion R2 in which the density is higher than the reference density range.

For example, the reference density range can be a density range including the reference density plus or minus 5% (a range that includes values greater than or equal to 95% and less than or equal to 105% of the reference density). Note that here, "density" is a value obtained by taking the logarithm of reflected light to incident light. Note that a functional unit of the CPU 210 of the computer 200 that realizes processing of step S20 is shown as a colorimetry unit 214 in FIG. 1.

Figure 3:
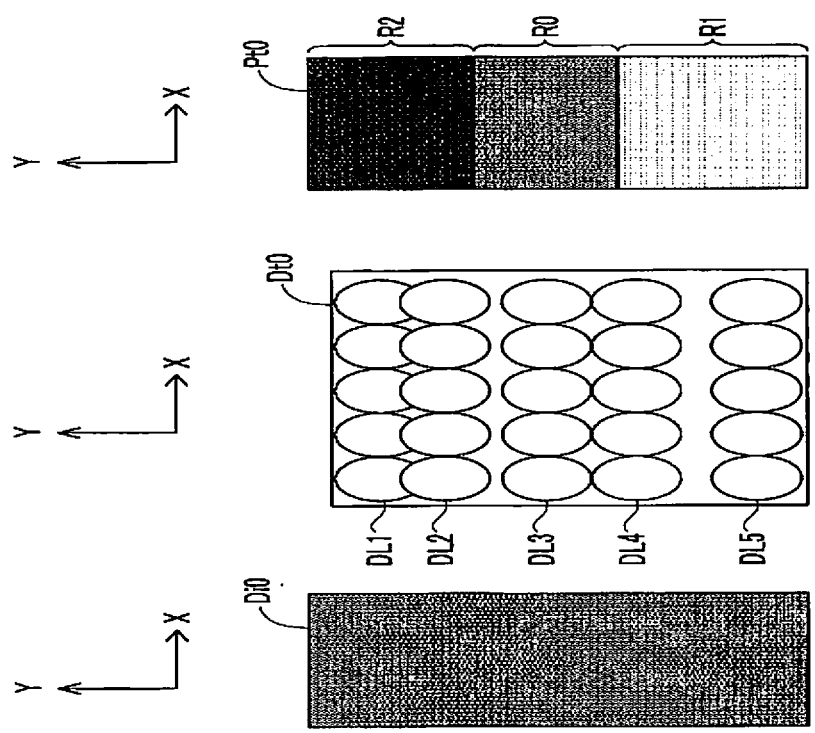
FIG. 3 is an explanatory diagram for explaining processing in step S20 in FIG. 2.

FIG. 3 is an explanatory diagram for explaining the processing in step S20 in FIG. 2. FIG. 3 does not accurately reflect the dimensions and the color densities of actual dots. On the left side of FIG. 3, an image Di0 of a model to be reproduced by applying the same reference signals to the piezoelectric elements of the nozzles in the case where it is assumed that the piezoelectric elements of the nozzles and the nozzles are ideal is shown. The image Di0 is a rectangular image having a uniform density.

On the right side of FIG. 3, the density distribution of the model Pt0 to be reproduced by applying the same reference signals to the piezoelectric elements of the nozzles of the actual head unit 50 is shown. The model Pt0 is a rectangular image having the portion R0 in which the density is in the reference density range including the reference density, the portion R1 in which the density is lower than that of R0, and the portion R2 in which the density is higher than that of R0. Even if a model is printed using the same curable liquid based on the same reference signal, a difference in density can occur depending on the site, as shown on the right side of FIG. 3. The cause is believed to be as follows.

Ideally, droplets of the colored curable liquids are discharged from the nozzles in the Z direction (see FIG. 1), and the droplets form arrays in which dots Dt0 are evenly aligned in the X direction and are evenly aligned in the Y direction on the modeling stage 11. However, in some cases, droplets discharged from one nozzle in parallel in the Z direction fly while being shifted in a +Y axis direction. In such a case, a dot line DL2 formed by the droplets that were discharged from the nozzle and aligned in the X direction is formed in the position shifted in the +Y axis direction from the original position in which the dot line DL2 should be formed (see center of FIG. 3). As a result, the dot line DL2 is formed in a position closer to an adjacent dot line DL1 in the +Y axis direction than the original position in which the dot line DL2 should be formed. In addition, the dot line DL2 is formed in a position that is more separated from a dot line DL3 in a −Y axis direction than the original position in which the dot line DL2 should be formed. Also in the case where droplets that are to be discharged from one nozzle in parallel in the Z direction fly while being shifted in the −Y axis direction, the same phenomenon takes place (see dot line DL5 in FIG. 3).

A portion of the model Pt0 formed in step S10, in which the dot lines aligned in the X direction are formed in positions that are close to one another, has a higher density. A portion in which the dot lines aligned in the X direction are formed in positions that are separated from one another has a lower density.

Note that in the case where droplets to be discharged from one nozzle in the Z direction in parallel fly while being shifted in the X direction, the density is not influenced compared with the case of the shift in the Y direction, as long as the angle of the shift is constant.

In addition, there also are cases in which the liquid amount of droplets discharged from a nozzle varies due to a manufacturing error of a piezoelectric element connected to the nozzle. In such a case, the size of dots of a dot line formed by the droplets discharged from the nozzle will deviate from the size of the original dots Dt0. Therefore, a portion of the model formed in step S10 in which the dot lines aligned in the X direction are formed with smaller dots than the original dots Dt0 has a lower density. A portion in which the dot lines aligned in the X direction are formed with larger dots than the original dots Dt0 has a higher density.

In step S30 in FIG. 2, the CPU 210 of the computer 200 determines a signal to be supplied to the piezoelectric elements in accordance with a measurement result of the density in step S20, such that a difference in density of printing results of the nozzles decreases. More specifically, first, the CPU 210 specifies a nozzle that printed the first portion R1 based on information regarding the position of the first portion R1 (see FIG. 3) obtained in step S20. In addition, the CPU 210 specifies a nozzle that printed the second portion R2 based on information regarding the position of the second portion R2 (see FIG. 3) obtained in step S20.

The CPU 210 then allocates, to the piezoelectric element corresponding to the nozzle that printed the first portion R1, a drive signal having a drive waveform that causes the amount of the curable liquid per droplet discharged from the nozzle to be greater than the amount of the curable liquid per droplet discharged based on the reference signal. The CPU 210 allocates, to the piezoelectric element corresponding to the nozzle that printed the second portion R2, a drive signal having a drive waveform that causes the amount of the curable liquid per droplet discharged from the nozzle to be less than the amount of the curable liquid per droplet discharged based on the reference signal.

The drive signal to be allocated to the piezoelectric element corresponding to the nozzle that printed the first portion R1 is a drive signal that causes the density of a printing result which is reproduced in the case where a drive waveform of the drive signal is supplied to an ideal piezoelectric element that the head unit 50 should be provided with in order to cause droplets to be discharged to be 105% of the reference density. On the other hand, the drive signal to be allocated to the piezoelectric element corresponding to the nozzle that printed the second portion R2 is a drive signal that causes the density of a printing result which is reproduced in the case a drive waveform of the drive signal is supplied to an ideal piezoelectric element that the head unit 50 should be provided with in order to cause droplets to be discharged to be 95% of the reference density. Data of the drive signal to be allocated to the piezoelectric element corresponding to the nozzle that printed the first portion R1, and data of the drive signal to be allocated to the piezoelectric element corresponding to the nozzle that printed the second portion R2 can be stored in the ROM of the control unit 70 in advance.

Figure 4:
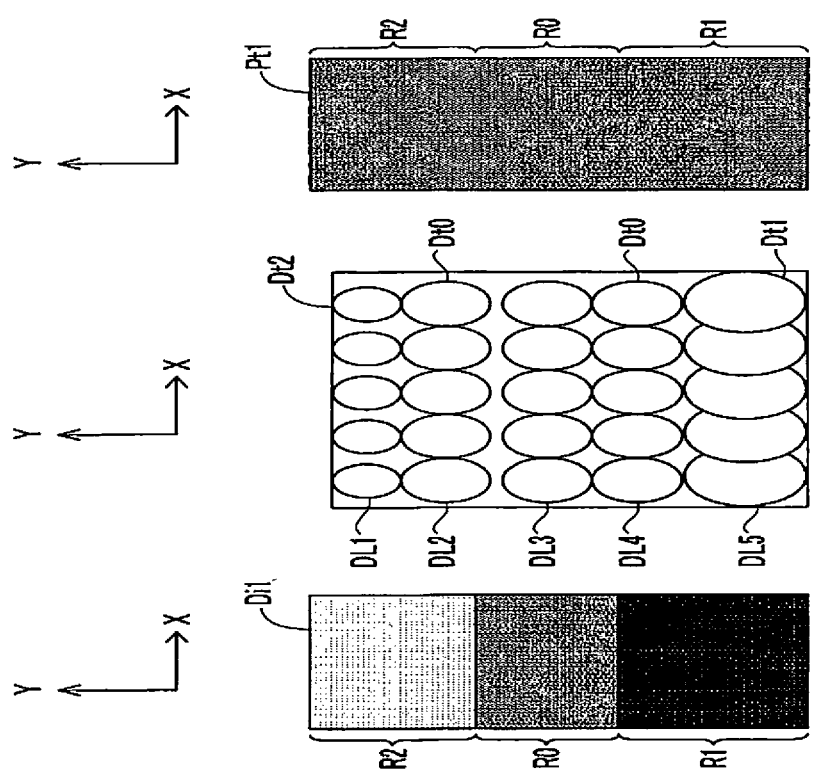
FIG. 4 is an explanatory diagram for explaining processing in step S30 in FIG. 2.

FIG. 4 is an explanatory diagram for explaining the processing in step S30 in FIG. 2. FIG. 4 does not accurately reflect the dimensions and the color densities of actual dots. On the left side of FIG. 4, an image Di1 of a virtual model that is to be reproduced by applying the drive signal allocated to the piezoelectric elements of the nozzles in step S30 in the case where it is assumed that the piezoelectric elements of the nozzles and the nozzles are ideal is shown. In a portion of the image Di1 corresponding to the first portion R1 of the model, a color deeper than the reference density is reproduced (specifically, the density is 105% of the reference density). In a portion of the image Di1 corresponding to the second portion R2 of the model, a color lighter than the reference density is reproduced (specifically, the density is 95% of the reference density).

On the right side of FIG. 4, the density distribution of a model Pt1 to be reproduced in the case where it is assumed that the drive signal allocated in step S30 in FIG. 2 is supplied to the piezoelectric elements of the nozzles of the actual head unit 50 and a model is printed again is shown. The model Pt1 has a smaller difference in color intensity compared with the model Pt0, and the density of the entire model is included in the reference density range. This is because the drive signal for forming larger dots Dt1 and, as a result, printing at a higher density was allocated to the piezoelectric element that printed the portion R1 of the model Pt0 formed in step S10, in which the density is low, (see dot line DL5 in FIGS. 3 and 4). This is also because the drive signal for forming smaller dots Dt2 and, as a result, printing at a lower density was allocated to the piezoelectric element that printed the portion R2 of the model Pt0, in which the density is high (see dot line DL1 in FIGS. 3 and 4).

Also in the case where the liquid amount of one droplet discharged by each nozzle varies due to a manufacturing error of the piezoelectric elements connected to the nozzles and uneven color intensity appears in a printing result, the processing of step S30 enables printing to be performed such that the entire image has a density included in the reference density range. This is because the drive signal for forming larger dots is allocated to the piezoelectric element that printed the portion R1 of the model Pt0 formed in step S10, in which the density is low due to the dots being small, and the drive signal for forming smaller dots is allocated to the piezoelectric element that printed the portion R2, in which the density is high due to the dots being large.

Due to the processing of step S30, the appropriate drive signal is allocated to the piezoelectric element for discharging droplets of the curable liquid with a color. As a result, the liquid amount of droplets per unit area to be discharged from the piezoelectric element that formed the first portion R1, and the liquid amount of droplets per unit area to be discharged from the piezoelectric element that formed the second portion R2 are adjusted such that a difference in density of colors to be reproduced by those piezoelectric elements decreases. A functional unit of the CPU 210 of the computer 200 that realizes the processing of step S30 is shown as an adjustment unit 216 in FIG. 1.

Processes of steps S10 to S30 in FIG. 2 are carried out for the arrays of the nozzles Nc, Nm, and Ny for discharging the curable liquids with colors. When modeling a three-dimensional object using the three-dimensional modeling apparatus 100, it is possible to model the three-dimensional object while reproducing a desired color using the ink colors by performing the processes of steps S10 to S30 in FIG. 2.

In step S40 in FIG. 2, the CPU 210 of the computer 200 models the three-dimensional object by controlling the three-dimensional modeling apparatus 100. First, in step S42, the CPU 210 generates, from three-dimensional data that indicates the shape of the three-dimensional object, data of a plurality of plate-like structures in the XY directions that is obtained by slicing the shape of the three-dimensional object in accordance with the modeling resolution (e.g., 600 dpi) in the Z direction. This data is referred to as "cross sectional data".

The three-dimensional data that indicates the shape of the three-dimensional object is data that indicates the shape and the color of the surface of the three-dimensional object. The cross sectional data has predetermined modeling resolutions in the X direction, the Y direction, and the Z direction (e.g., 1200 dpi×1200 dpi×1200 dpi). The cross sectional data is data that indicates the shapes and the colors of the peripheries of predetermined cross sections of the three-dimensional object (XY plain). The cross sectional data has predetermined modeling resolutions in the X direction and the Y direction (e.g., 600 dpi×600 dpi).

When generating the cross sectional data, the CPU 210 performs resolution conversion, based on the three-dimensional data, from the resolutions of the three-dimensional data (e.g., 1200 dpi×1200 dpi×1200 dpi in each of directions XYZ) into resolutions that are in accordance with the performance of the three-dimensional modeling apparatus 100 (e.g., 600 dpi×600 dpi×600 dpi in each of directions XYZ). Note that virtual elements of a rectangular parallelepiped or a cube that internally partition a three-dimensional space defined in accordance with the resolutions in the X direction, the Y direction and the Z direction are referred to as "voxels".

The CPU 210 also converts color information that the three-dimensional data has regarding the surface of the three-dimensional object (e.g., which is indicated by basic colors, that is, red, green, and blue) into color information indicated by the ink colors (e.g., cyan, magenta, and yellow) of the three-dimensional modeling apparatus 100. The CPU 210 also provides the color information obtained in this manner to the voxels of an outermost layer and in addition, the voxels of the layer directly inside the outermost layer.

In step S42, the cross sectional data is indicated by two-dimensional raster data in which the gradation value of the ink color is stored for each element defined in accordance with the predetermined modeling resolutions in the X direction and the Y direction (e.g., 600 dpi×600 dpi in the X and Y directions). The gradation value stored for each of the elements indicates the amount of the curable liquid to be discharged to XY coordinates corresponding to the element.

In step S44 in FIG. 2, the CPU 210 controls the powder supply unit 20 and the flattening mechanism 30 via the control unit 70, and forms a powder layer in the container 10c. The CPU 210 then drives the head unit 50 and discharges the curable liquid onto the powder layer via the control unit 70 in accordance with the cross sectional data.

More specifically, the control unit 70 causes the head unit 50 to scan in the X direction via the scanning unit 52, while causing the curable liquid with a color of cyan, magenta or yellow, or the colorless curable liquid to be discharged from each of the nozzles of the nozzle arrays in accordance with the cross sectional data. At this time, the control unit 70 causes the head unit 50 and the curing energy applying unit 60 to scan such that first, the head unit 50 passes sites on the powder layer, and subsequently, the curing energy applying unit 60 passes the sites.

Subsequently, the control unit 70 moves, via the scanning unit 52, the head unit 50 in the X direction to a position in which the head unit 50 was located before the scanning in the X direction was started. When the scanning in the X direction ends, the control unit 70 causes the head unit 50 to scan in the Y direction via the scanning unit 52. The control unit 70 then causes the head unit 50 to scan in the X direction again, while causing droplets to be discharged from the nozzles. By repeating the scanning in the X direction performed while discharging droplets and the scanning in the Y direction in this manner, a plate-like structure Ps corresponding to the cross sectional data for one layer is formed in the powder layer in the container 10c (see FIG. 1). The plate-like structure Ps made of droplets is supported by the modeling stage 11.

In step S46, the CPU 210 determines whether or not plate-like structures Ps were formed in accordance with all the cross sectional data corresponding to the three-dimensional data that indicates the shape of the three-dimensional object. In the case where the plate-like structures Ps were not formed in accordance with all the cross sectional data corresponding to the three-dimensional data that indicates the shape of the three-dimensional object (step S46: No), the procedure advances to step S48.

In step S48, the CPU 210 drives the actuator 13 via the control unit 70, and causes the modeling stage 11 to descend downward in the Z direction by a lamination pitch that is in accordance with the modeling resolution in the Z direction (e.g., 600 dpi) (see FIG. 1). Subsequently, the procedure returns to step S44 and similar processing is repeated. That is, the control unit 70 forms a new powder layer on the plate-like structure Ps that has already been formed on the modeling stage 11 (see FIG. 1).

On the other hand, in the case where the plate-like structures Ps were formed in accordance with all the cross sectional data corresponding to the three-dimensional data that indicates the shape of the three-dimensional object in step S46 in FIG. 2 (step S46: Yes), the CPU 210 ends the procedure. Note that a functional unit of the CPU 210 of the computer 200 that realizes processes of steps S44 to S48 is shown as a modeling unit 218 in FIG. 1. The modeling unit 218 realizes, along with the control unit 70 of the three-dimensional modeling apparatus 100, the processes of steps S44 to S48.

Figure 5:
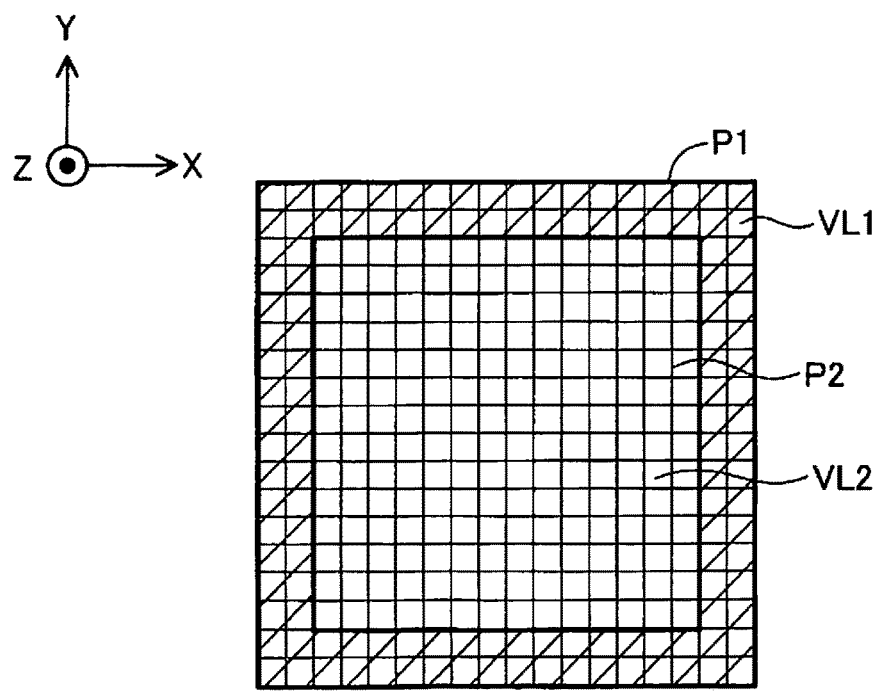
FIG. 5 is an explanatory diagram showing processing when a control unit 70 drives a head unit 50 and discharges a curable liquid onto a powder layer in accordance with cross sectional data in step S44 in FIG. 2.

FIG. 5 is an explanatory diagram showing processing when the control unit 70 drives the head unit 50, and causes the curable liquid to be discharged onto the powder layer in accordance with the cross sectional data in step S44 in FIG. 2. FIG. 5 is a diagram showing a state in which the plate-like structure Ps formed in accordance with the cross sectional data is seen in plan view. In step S44 in FIG. 2, regarding, in the plate-like structure Ps indicated by the cross sectional data, voxels VL1 that make up a structural portion P1 of two layers of the outermost periphery, the CPU 210 discharges the curable liquids of one or more of cyan, magenta, and yellow from the nozzles Nc, Nm, and/or Ny in accordance with the information regarding the color of the outer periphery of the cross sectional data and thereby creates the plate-like structure Ps. Regarding, in the plate-like structure Ps indicated by the cross sectional data, voxels VL2 that make up an internal structural portion P2 surrounded by the structure portion P1 of the two layers of the outermost periphery, the CPU 210 discharges a transparent curable liquid from the nozzles Nt, and thereby creates the plate-like structure Ps.

When discharging the curable liquid to the voxels VL1 of the two layers of the outermost periphery of the plate-like structure Ps indicated by the cross sectional data, the control unit 70 supplies the drive signal allocated in step S30 to the piezoelectric elements for discharging the colored curable liquid.

On the other hand, when discharging the curable liquid to the voxels VL2 surrounded by the voxels VL1 of the two layers of the outermost periphery of the plate-like structure Ps indicated by the cross sectional data, the CPU 210 supplies a drive signal, which was not subjected to the adjustment in steps S10 to S30, to the piezoelectric elements for discharging the colorless curable liquid. Note that regarding the piezoelectric elements for discharging the colorless curable liquid, adjustment may be performed besides the adjustment of steps S10 to S30, such that heights of the positions of the plate-like structure Ps in the Z direction approach uniformity.

Figure 6:
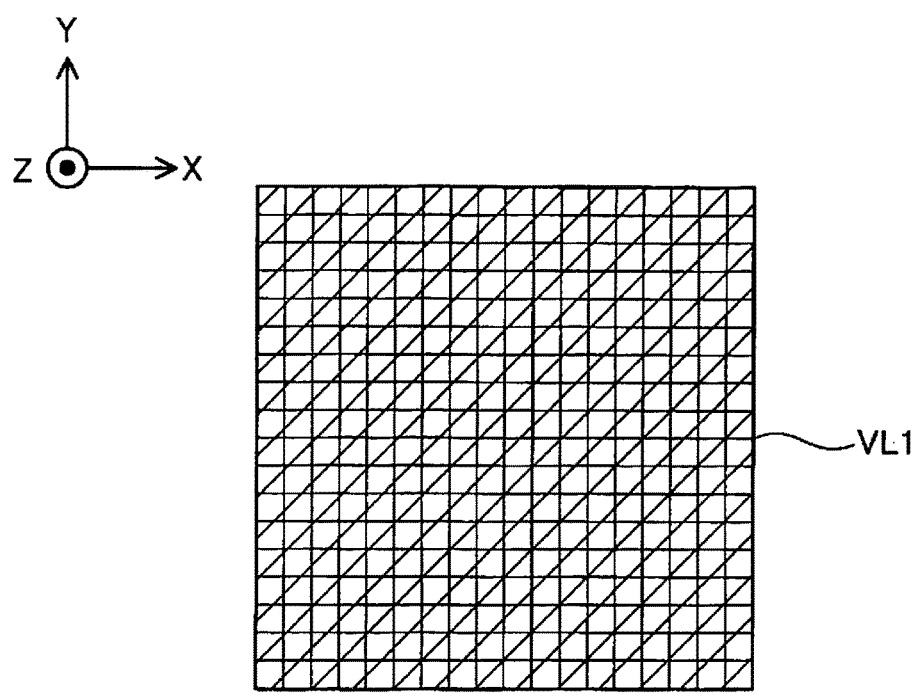
FIG. 6 is an explanatory diagram showing relation between a curable liquid and voxels in cross sectional data corresponding to an uppermost layer of a rectangular parallelepiped in the case of modeling the rectangular parallelepiped as a three-dimensional object.

FIG. 6 is an explanatory diagram showing the relation between the curable liquid and the voxels in the cross sectional data corresponding to the uppermost layer of a rectangular parallelepiped in the case of modeling the rectangular parallelepiped as the three-dimensional object. In step S44 in FIG. 2, regarding, in the plate-like structure Ps indicated by the cross sectional data, the voxels VL1 of the two layers of the outermost periphery, the CPU 210 discharges the curable liquid in cyan, magenta, and/or yellow in accordance with the information regarding the color of the periphery of the cross sectional data, and thereby creates the plate-like structure Ps, as described above. Therefore, the CPU 210 creates the plate-like structure Ps by discharging the curable liquid in cyan, magenta, and/or yellow for the voxels VL1 of the cross sectional data corresponding to the uppermost layer of the rectangular parallelepiped, and the cross sectional data corresponding to a layer directly under the uppermost layer, in accordance with the information regarding the color of the periphery of the cross sectional data. At this time, the control unit 70 supplies the drive signal allocated in step S30 to the piezoelectric elements for discharging the colored curable liquid. The same can be applied to the case of discharging the curable liquid for the voxels of the cross sectional data corresponding to the lowermost layer of the rectangular parallelepiped as the three-dimensional object and the cross sectional data corresponding to the layer directly above the lowermost layer.

According to this embodiment described above, with the droplet discharging units for discharging droplets, it is possible to shape, using the droplets having the ink colors, a three-dimensional object, in which unevenness in color intensity is small and which has a color as originally envisioned on the surface thereof, even in the case where there is variation in amount of each droplet or variation in landing position of the droplets.

Note that the three-dimensional modeling apparatus 100 and the computer 200 in this embodiment correspond to "three-dimensional modeling apparatus" in the summary. The nozzles Nc, Nm and Ny, and the piezoelectric elements corresponding to the nozzles correspond to "droplet discharging units". The modeling stage 11 corresponds to "supporting unit". The X direction corresponds to "first direction". The Y direction corresponds to "second direction". The CPU 210 of the computer 200 and the control unit 70 of the three-dimensional modeling apparatus 100 correspond to "control unit".

B. Second Embodiment

Figure 7:
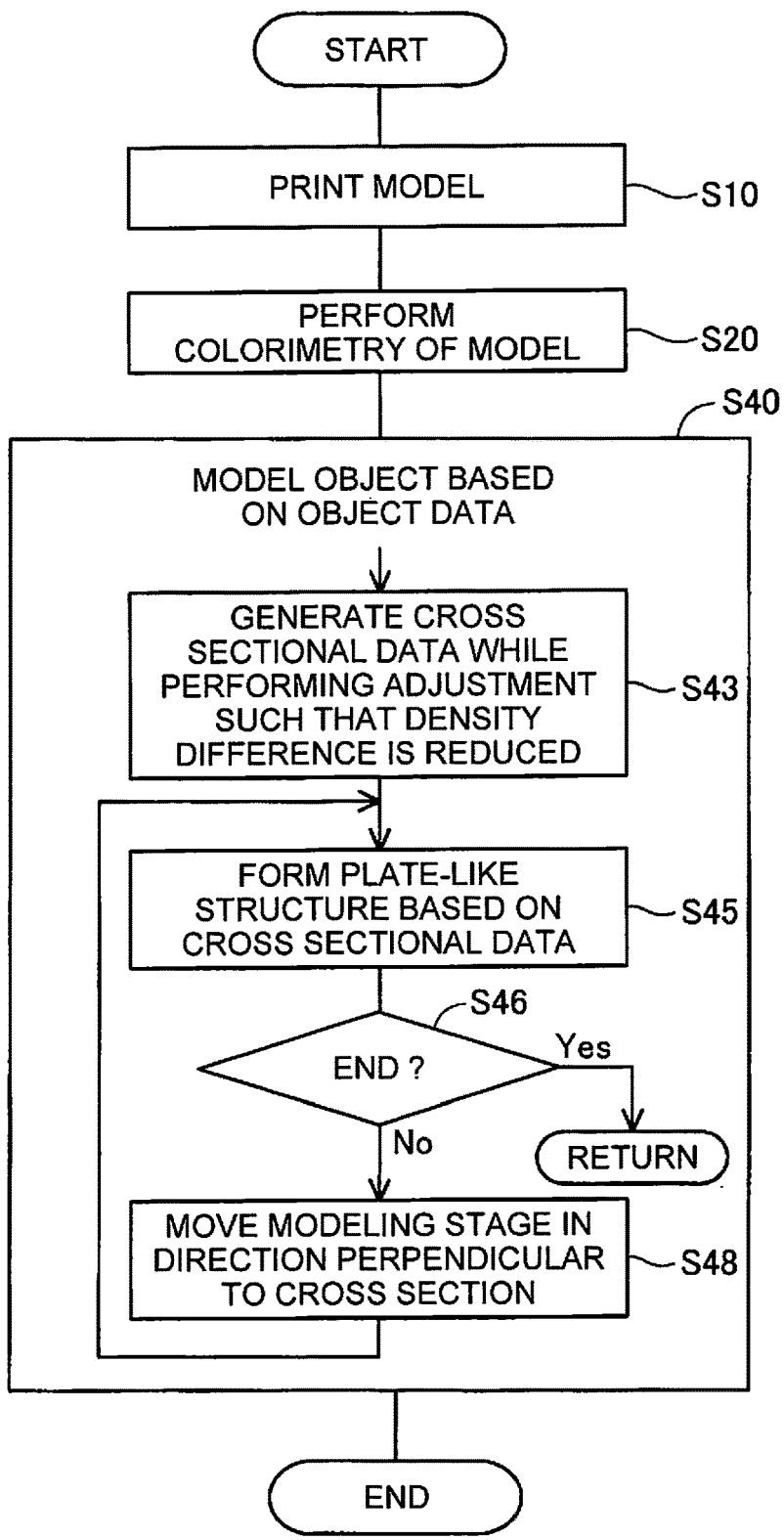
FIG. 7 is a flowchart for explaining processing for modeling a three-dimensional object according to a second embodiment.

FIG. 7 is a flowchart for explaining processing for modeling a three-dimensional object according to the second embodiment. In the second embodiment, the head unit 50 can discharge, from the nozzles, large, moderate, and small droplets that have different amounts from one another. As a result, in processing of step S45 in FIG. 7 that replaces processing of step S44 in FIG. 2, droplets of three stages that have different amounts from one another are discharged for the voxels.

In the second embodiment, the processing of step S30 in FIG. 2 of the first embodiment is not performed. Moreover, instead of processing of step S42 in FIG. 2, processing of step S43 is performed. In step S43, in processing corresponding to generation of the cross sectional data in step S42 in FIG. 2, adjustment is performed such that a density difference in printing results is reduced by changing, for each nozzle, the discharge ratio of droplets to be allocated to the gradation value of the density of each of the colors. In other respects, the second embodiment is the same as the first embodiment.

Figure 8:
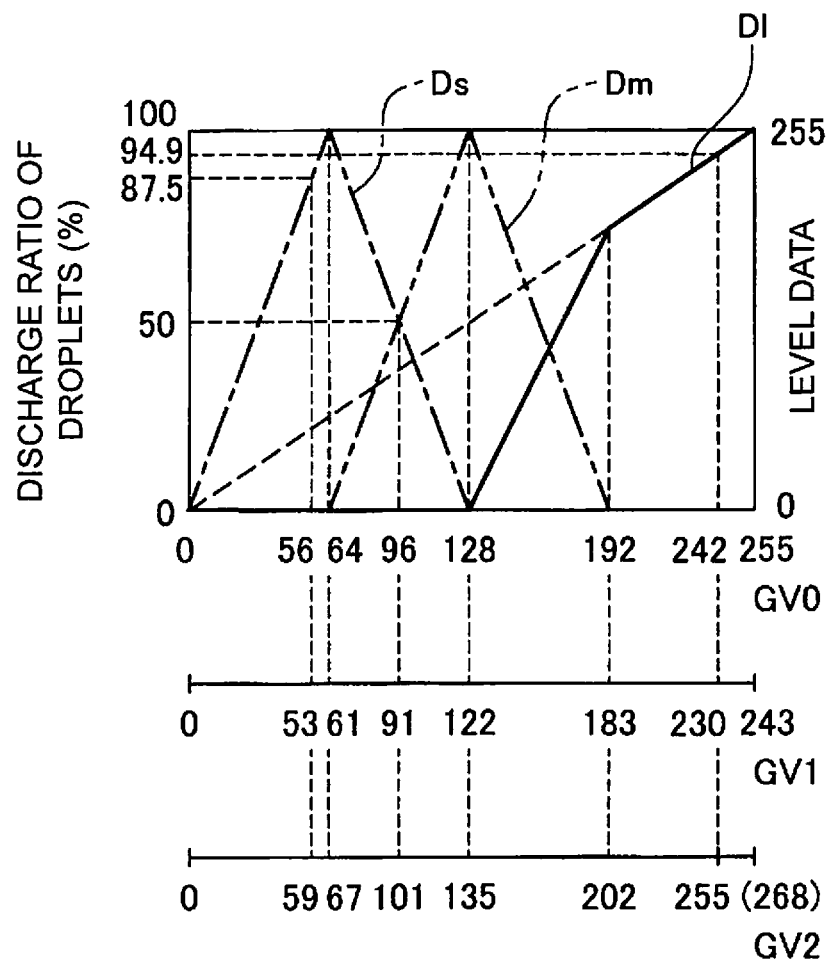
FIG. 8 is a diagram showing gradation values of ink colors to be allocated to voxels, and discharge ratios of droplets.

FIG. 8 is a diagram showing the gradation values of the ink colors to be allocated to the voxels and discharge ratios of droplets in processing of step S45 in FIG. 7. A horizontal axis GV0 indicates the gradation value of an ink color to be expressed for one voxel, and a vertical axis indicates the discharge ratio of one of large, moderate, and small droplets (shown on the left side) and the value of corresponding level data (shown on the right side). Here, "discharge ratio" is a command value indicating the proportion (ratio) of droplets discharged from the piezoelectric element and the nozzle as the droplet discharging units.

In FIG. 8, the discharge ratios of small droplets, moderate droplets, and large droplets for the gradation values of the ink colors to be expressed are respectively indicated by a one dotted chain line Ds, a two-dot chain line Dm, and a solid line Dl. For example, when expressing an area with the gradation value of 56, only small droplets are supplied for 87.5% of the voxels of the area. When expressing an area with the gradation value of 128, only moderate droplets are supplied for 100% of the voxels of the area. When the gradation value is 96, small droplets are supplied for 50% of the voxels of the area, and moderate droplets are supplied for the voxels of 50%.

Figure 9:
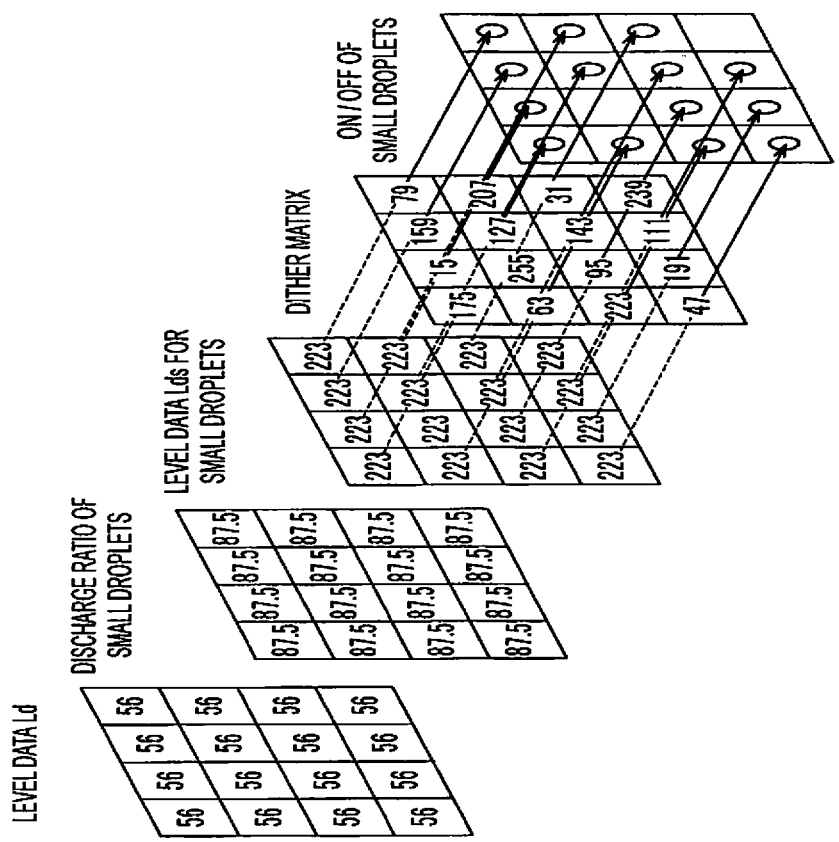
FIG. 9 is an explanatory diagram showing a method for applying a dithering method and determining the presence or absence of supply of droplets for voxels when a gradation value to be expressed is 56.

FIG. 9 is an explanatory diagram showing a method for applying a dithering method and determining the presence or absence of supply of droplets for the voxels when the gradation value of the ink color to be expressed is 56. Here, processing content is explained by envisioning the cross sectional data corresponding to the uppermost face of a rectangular parallelepiped (see FIG. 6). In the dithering method, first, a target voxel group targeted for data conversion is selected among the voxels of the cross sectional data. Here, assume that 16 voxels (4 rows×4 columns) in the cross sectional data corresponding to the uppermost face of the rectangular parallelepiped are selected (one by one) sequentially. Data conversion using a dither matrix DM is then performed on the selected target voxel group sequentially.

For example, when expressing an area with the gradation value of 56 as shown on the leftmost portion of FIG. 9, only small droplets are supplied for 87.5% of the voxels of the area as described above (see FIG. 8). In FIG. 9, the discharge ratio of small droplets is shown in a second left panel. In level data Lds for small droplets that is to be newly generated, the gradation value of small droplets is designated as 223, which is 87.5% of the maximum value 255. The level data Lds for small droplets is shown in a center of FIG. 9.

A dither matrix is then applied to the created level data Lds for small droplets. A dither matrix DM has, for each element, a threshold value for determining whether or not to supply droplets. In the case where the gradation value of a corresponding voxel is greater than or equal to the threshold value of the dither matrix DM, droplets are supplied for the voxel. In the case where the gradation value of a corresponding voxel is less than the threshold value, droplets are not supplied for the voxel. In this embodiment, the gradation value of each color has a value from 0 to 255, and the dither matrix DM is a 4×4 matrix corresponding to the target voxel group. Therefore, the threshold values of the dither matrix DM are values of 15 to 255 obtained by equally dividing a range of gradation values 0 to 255 by 16. A supply state of droplets is as shown on the right side of FIG. 9 when the gradation values of the elements of the level data Lds for small droplets are compared with the corresponding threshold values of the dither matrix DM, and the presence or absence of supply of droplets for the voxels is determined.

Regarding the moderate droplets and the large droplets as well, the same processing is performed. Note that when expressing an area with the gradation value of 56, only small droplets are supplied as described above (see FIG. 8). Therefore, the discharge ratios of the moderate droplets and the large droplets are 0, and the gradation values of the elements of the level data Ldm for moderate droplets and the level data Ldl for large droplets are all 0. As a result, the moderate droplets and the large droplets are not supplied to any of the voxels of the area with the gradation value of 56.

In this manner, the color of the cross sectional data for the voxels indicated by the gradation value of C, M, and Y (0 to 255) is converted into data indicated by the presence or absence of supply of large, moderate, and small droplets of C, M, and Y, and used for generating the plate-like structure Ps (see step S45 in FIG. 7). Note that in the second embodiment, assume that the plate-like structure Ps is formed by performing pseudo band printing in step S40. Processing content was described above by envisioning the cross sectional data corresponding to the uppermost face of the rectangular parallelepiped, however, the same processing is also performed on voxels of two layers of a periphery portion for other cross sectional data (see FIG. 5).

In the second embodiment, prior to processing for converting the gradation value of the ink color shown in FIG. 8 into the discharge ratio of droplets, the CPU 210 adjusts the gradation value of the ink color as follows in step S43 in FIG. 7.

In the plate-like structure Ps formed by performing pseudo band printing, regarding an area corresponding to the first portion R1, in which the density in step S20 is lower than the reference density range (see FIG. 3), the gradation value of the ink color is multiplied by a coefficient larger than 1 (e.g., 1.05) and converted in advance. The gradation value before this conversion processing is denoted by GV1 in FIG. 8.

Note that an area corresponding to the first portion R1 and an area corresponding to the second portion R2 in the plate-like structure Ps can be specified as follows. That is, in modeling the plate-like structure Ps (step S45 in FIG. 7), the nozzles for printing the areas of the plate-like structure Ps are specified in advance. It is then determined whether or not each of those nozzles matches the nozzle that printed the first portion R1 in step S10. It is also determined whether or not each of those nozzles matches the nozzle that printed the second portion R2 in step S10. In this manner, in step S43 in FIG. 7, in the plate-like structure Ps, the area corresponding to the first portion R1 and the area corresponding to the second portion R2 can be specified in advance.

As a result of the above-mentioned conversion processing of the gradation value, in the case where a gradation value before conversion GV1 is 243, for example, droplets are discharged at a frequency of large, moderate and small droplets that corresponds to the case in which a gradation value GV0 is 255 in step S45. That is, with the gradation value being 243, large droplets are recorded for 100% of the voxels. As a result, regarding a portion in which the density will be lower than the reference density range in the case where the plate-like structure Ps was formed in accordance with the gradation value before conversion (see R1 in FIG. 3), the discharge ratio of droplets is adjusted, thereby allowing reproduction with a higher density.

Similarly, regarding, in the plate-like structure Ps formed by performing pseudo band printing, the area corresponding to the second portion R2 in which the density in step S20 is higher than the reference density range (see FIG. 3), the gradation value of the ink color is multiplied by a coefficient less than 1 (e.g., 0.95) and converted in advance. The gradation value before the conversion is denoted by GV2 in FIG. 8. As a result of the above-mentioned conversion processing, in the case where the gradation value before conversion GV2 is 255, for example, droplets are discharged at a frequency of large, moderate and small droplets that corresponds to the case in which the gradation value GV0 is 242. As a result, regarding a portion, in which the density is higher than the reference density range in the case where the plate-like structure Ps is formed in accordance with the gradation value before conversion (see R2 in FIG. 3), the discharge ratio of droplets is adjusted, thereby allowing reproduction with a lower density.

In step S43 in FIG. 7, in the case where the same density is designated as a result of performing the above processing, the discharge ratio indicating the proportion of droplets (e.g., small droplets) to be discharged from the piezoelectric element that formed the first portion R1 and the discharge ratio indicating the proportion of droplets, which correspond to the droplets (e.g., small droplets that correspond to the small droplets) and are to be discharged from the piezoelectric element that formed the second portion R2, are adjusted such that a difference in density of colors to be reproduced by the piezoelectric elements decreases. It is the adjustment unit 216 as a functional unit of the CPU 210 that performs the above-described processing.

Subsequently, in step S45 in FIG. 7, the plate-like structure Ps is formed by discharging large, moderate, and small droplets of the ink colors, in accordance with the cross sectional data generated in step S43 (see FIG. 1).

According to the second embodiment described above as well, with the droplet discharging units for discharging droplets, it is possible to shape, using the droplets having the ink colors, a three-dimensional object, which has a color as originally envisioned on the surface thereof, even in the case where there is variation in amount of each droplet, or variation in landing position of the droplets.

C. Third Embodiment

Figure 10:
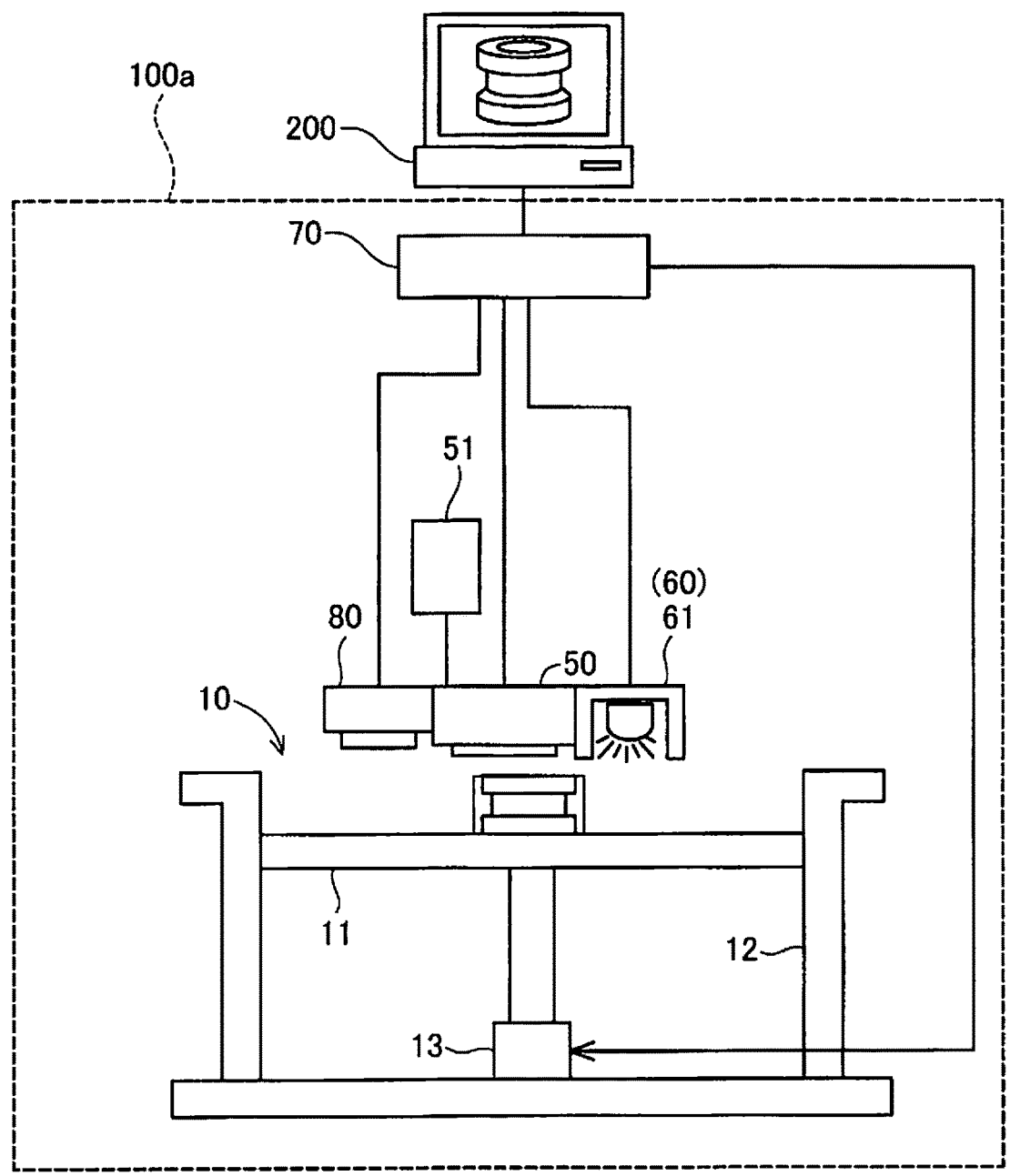
FIG. 10 is an explanatory diagram showing a schematic configuration of a three-dimensional modeling apparatus of a third embodiment.

FIG. 10 is an explanatory diagram showing the schematic configuration of a three-dimensional modeling apparatus in the third embodiment. The three-dimensional modeling apparatus 100 of the first and second embodiments models a three-dimensional object by discharging the curable liquid onto the powder that was supplied in the modeling unit 10. On the other hand, the three-dimensional modeling apparatus 100a of the third embodiment models a three-dimensional object by using only curable liquid containing a resin without using powder. In the third embodiment, data processing such as generation of the cross sectional data that is generated by the CPU 210 of the computer 200 and the control unit 70 of the three-dimensional modeling apparatus 100a, and generation of ON/OFF data of droplets that is generated from the cross sectional data is the same processing as processing of the first embodiment.

The three-dimensional modeling apparatus 100a is provided with the modeling unit 10, the head unit 50, the curing energy applying unit 60, the control unit 70, and the colorimeter 80. The modeling unit 10 is provided with the modeling stage 11, the frame body 12 and the actuator 13 similarly to the first embodiment. However, the frame body 12 may be omitted. The tank 51 is connected to the head unit 50. The curing energy applying unit 60 is the light emitting apparatus 61 that is fixed to the head unit 50 so as to be aligned with the head unit 50 in the X direction.

The configuration of the three-dimensional modeling apparatus 100a is such that the powder supply unit 20, the flattening mechanism 30, and the powder collecting unit 40 are omitted from the three-dimensional modeling apparatus 100 of the first embodiment. In other respects, the three-dimensional modeling apparatus 100a is the same as the three-dimensional modeling apparatus 100 of the first embodiment. The three-dimensional modeling apparatus 100a as described above can also model a three-dimensional object with the same processing as that of the three-dimensional modeling apparatus 100 of the first embodiment, except for processing of forming a powder layer.

In the third embodiment, the three-dimensional object can be modeled using a supporting material. The supporting material in this embodiment is a liquid that cures due to curing energy that is equivalent to the curing energy that cures the curable liquid, and is a material that dissolves by being exposed to water or a predetermined solution after curing and can be easily removed. If the supporting material is discharged toward the outer contour of the three-dimensional object, in a case of modeling an object having a shape with areas of cross section bodies of upper layers larger than those of lower layers, a portion with the larger areas can be supported by the supporting material of the lower layers.

In the three-dimensional modeling apparatus 100 of the third embodiment, the head unit 50 is provided with nozzles for discharging a curable liquid and nozzles for discharging the supporting material, and additionally, a tank in which the curable liquid is stored, and a tank in which the supporting material is stored are connected to the head unit 50. In this embodiment, the head unit 50 discharges the supporting material during scanning that is the same as the scanning for discharging the curable liquid. Note that the head unit 50 can discharge the supporting material during scanning that is different from the scanning for discharging the curable liquid.

In such an aspect, processes of steps S10 to S30 in FIG. 2 of the first embodiment enable printing with small unevenness in color intensity.

D. Modification Examples

D1. Modified Example 1

In the above embodiments, the nozzles for discharging the curable liquid with one color are in a row of nozzles arranged in the Y direction. However, the nozzles for discharging the curable liquid with one color can be nozzles in two or more rows. An aspect can also be adopted in which the nozzles for discharging the curable liquid with one color are arranged in zigzag in the Y direction. That is, an aspect can be adopted in which the nozzles for discharging the curable liquid with one color include a plurality of nozzles arranged in positions different from one another in a direction that is different from a direction of the operations performed while discharging droplets.

D2. Modified Example 2

In the above embodiment, the modeling stage 11 does not move in the X direction and the Y direction, and the head unit 50 provided with the nozzles and the piezoelectric elements as the droplet discharging units is moved by the scanning unit 52. Moreover, the head unit 50 does not move in the Z direction, and the modeling stage 11 as the supporting unit is moved by the actuator 13. However, an aspect can be adopted in which the droplet discharging units move in the three directions intersecting one another. An aspect can also be adopted in which the supporting unit moves in the three directions intersecting one another. An aspect can also be adopted in which the supporting unit moves in two directions intersecting each other, and the droplet discharging units move in a direction intersecting those two directions.

Note that in the above embodiments, the head unit 50 provided with the nozzles and the piezoelectric elements as the droplet discharging units and the modeling stage 11 as the supporting unit are moved in the X, Y, and Z directions intersecting orthogonally to one another. However, the directions in which the droplet discharging units and the supporting unit relatively move do not need to orthogonally intersect. However, it is preferable that those directions are directions intersecting one another.

D3. Modified Example 3

In the above embodiments, the colorimeter 80 is fixed to the head unit 50 provided with the nozzles and the piezoelectric elements as the droplet discharging units, and is moved (together) with the head unit 50 by the scanning unit 52. However, the colorimeter may be provided separately from the droplet discharging units. However, a configuration is preferable in which the colorimeter can be moved in one or more directions that are the same as one or more directions of movement of the droplet discharging unit with respect to the supporting unit. Moreover, the colorimeter does not need to be provided as a part of the three-dimensional modeling apparatus. However, a configuration is preferable in which the colorimeter can perform colorimetry of a model, and provide, to the control unit of the three-dimensional modeling apparatus, information regarding a first portion of the model and a second portion of the model that has a color of a higher density than the first portion.

D4. Modified Example 4

In the above embodiments, the light emitting apparatus 61 as the curing energy applying unit 60 is provided on one side of the head unit 50 in the X direction. However, the light emitting apparatus 61 as the curing energy applying unit 60 can be provided on both sides of the head unit 50 in the X direction. With such an aspect, the colorimeter 80 may be provided on the opposite side to the head unit 50 so as to sandwich the curing energy applying unit 60, or the head unit 50 and the curing energy applying unit 60 may be independently provided.

D5. Modified Example 5

In the above embodiments, the model Pt0 is formed of the powder for one layer and the curable liquid. However, a model targeted for colorimetry can be formed in another aspect. That is, the model may be formed by discharging the curable liquid on a sheet-like member such as paper or a resin sheet arranged on the modeling stage 11. Note that in such an aspect, the sheet preferably has a color different from that of the curable liquid (e.g., white).

D6. Modified Example 6

In the above embodiments, in step S10 in FIGS. 2 and 7, the model is formed by pseudo band printing. However, the model may be formed with other printing methods. However, the model is preferably generated with the same scanning method as that of the printing method used in the generation of the plate-like structure that is performed in accordance with the cross sectional data.

D7. Modified Example 7

In the above embodiments, for the piezoelectric element that produces a printing result with a density larger than 105% of the reference density, and the piezoelectric element that produces a printing result with a density lower than 95% of the reference density, the liquid amounts of droplets to be discharged are adjusted. However, the droplet discharging unit as a target of adjusting the liquid amount of the droplets to be discharged can be selected in accordance with other criteria. For example, a droplet discharging unit that produces a printing result with a density larger than 103% of the reference density can be targeted for adjustment. A droplet discharging unit that produces a printing result with a density lower than 97% of the reference density can be targeted for adjustment. That is, an aspect can be adopted in which among the plurality of droplet discharging units that produce printing results with different densities, at least one of the droplet discharging unit that produces a printing result with a higher density, and the droplet discharging unit that produces a printing result with a lower density is adjusted.

D8. Modified Example 8

In the above first embodiment, based on data of the drive signal stored in the ROM of the control unit 70, different drive signals are allocated to the piezoelectric element for forming an area having a color darker than the reference density or the piezoelectric element for forming an area having a color lighter than the reference density. However, other methods can be adopted when adjusting a signal to be supplied, for discharging one droplet, to the first type droplet discharging unit and a signal to be supplied, for discharging one droplet, to the second type droplet discharging unit that performs printing at a higher density. For example, when generating the drive signals to be supplied to the first type and second type droplet discharging units, the variation width of one drive signal is increased or decreased compared with the other drive signal by changing the drive voltage that is applied while using a common drive waveform, and thereby different drive signals can be generated.

D9. Modified Example 9

In the above embodiments, both the liquid amount of droplets per unit area to be discharged from the droplet discharging unit that formed the first portion R1 and the liquid amount of droplets per unit area to be discharged from the droplet discharging unit that formed the second portion R2 are adjusted. However, an aspect can also be adopted in which the liquid amount of droplets per unit area to be discharged from the droplet discharging unit that formed the first portion R1 is adjusted and the liquid amount of droplets per unit area to be discharged from the droplet discharging unit that formed the second portion R2 is not adjusted. An aspect can also be adopted in which the liquid amount of droplets per unit area to be discharged from the droplet discharging unit that formed the first portion R1 is not adjusted, and the liquid amount of droplets per unit area to be discharged from the droplet discharging unit that formed the second portion R2 is adjusted.

D10. Modified Example 10

In the above first embodiments, step S30 that is a step of performing adjustment such that a difference in density of the color of a printing result is reduced is performed before step 40 that is a step of modeling an object. However, the step of performing adjustment such that the difference in density of the color of the printing result is reduced may be performed between processes of modeling an object. For example, an aspect can also be adopted in which a series of processes of adjusting the cross sectional data such that a difference in density of the color of the printing results is reduced, and subsequently, modeling the object is repeatedly performed.

D11. Modified Example 11

In the above embodiments, the droplets of the curable liquid with a color are supplied for the voxels of the outermost surface of the three-dimensional object to be modeled and the layer directly inside the outermost surface. The droplets of the curable liquid without a color are supplied for the voxels inside the three-dimensional object to be modeled. However, droplets of the curable liquid with a color can also be supplied to the internal portion of three-dimensional object to be modeled. The three-dimensional object formed in this manner will be provided with colors and patterns on a cut surface obtained in the case of being cut.

D12. Modified Example 12

In modeling the three-dimensional object according to the above second embodiment, pseudo band printing is performed (see step S45 in FIG. 7). However, for example, in the first and third embodiments, pseudo band printing can be performed, and so-called interlace printing can also be performed. In the embodiments, multipath printing can also be performed.

"Interlace printing" is a printing method in which during scanning in one direction, droplets are supplied for lines of voxels in spaces between lines of voxels which are aligned in the scan direction and to which droplets have already been supplied, while, regarding an area in which droplets are to be newly supplied, newly supplying droplets for every other line of voxels or each several lines of voxels that are aligned in the scanning direction. "Multipath printing" is a printing method in which different droplet discharging units share the task of supplying droplets for a plurality of voxels in a line of voxels aligned in one scanning direction.

D13. Modified Example 13

In the above second embodiment, droplets of three types, that is, large, moderate, and small droplets can be discharged from the piezoelectric elements and the nozzles as the droplet discharging units. However, the number of types of droplets that can be discharged from the droplet discharging units may be one, four or five. In addition, the three-dimensional modeling apparatus can be provided with droplet discharging units that are different in the type or size of droplets that can be discharged.

D14. Others

The invention is not limited to the above embodiments, examples, and modifications, and can be achieved in various configurations without departing from the gist of the invention. For example, the technical features in the embodiments, examples, and modifications corresponding to the technical features in the modes can be replaced or combined as appropriate in order to solve some or all of the problems described above, or in order to achieve some or all of the aforementioned effects. A technical feature that is not described as essential in the specification can be removed as appropriate.

The entire disclosure of Japanese Patent Application No.: 2015-010444, filed Jan. 22, 2015 and 2015-183755, filed Sep. 17, 2015 are expressly incorporated by reference herein.

What is claimed is:

1. A three-dimensional modeling apparatus for modeling an object by discharging droplets, the three-dimensional modeling apparatus comprising:
    a plurality of droplet discharging units configured to individually discharge droplets;
    a supporting unit that supports a structure made of the droplets;
    a scan unit configured to move the plurality of droplet discharging units relative to the supporting unit in a first direction intersecting a discharging direction of the droplets, and in a second direction intersecting the discharging direction of the droplets and the first direction;
    a colorimeter that measures a color of a targeted object arranged on the supporting unit; and
    a control unit that controls the droplet discharging units, the supporting unit, and the scan unit to form a model based on a predetermined data for the model, and form the object based on object data that indicates a shape and a color of the object after forming the model,
    wherein the control unit includes:
    a model forming unit that forms the model by discharging droplets having a single predetermined color from the plurality of droplet discharging units based on the same reference signal;
    a colorimetry unit that causes the colorimeter to measure a color of the model to perform colorimetry of the model and specifies a first portion of the model and a second portion of the model that has the color with a higher density than the first portion;
    an adjustment unit that adjusts at least one of the liquid amount of droplets per unit area to be discharged from, among the plurality of droplet discharging units, a first type droplet discharging unit that formed the first portion, and the liquid amount of droplets per unit area to be discharged from, among the plurality of droplet discharging units, a second type droplet discharging unit that formed the second portion, by converting, based on measurement result of measuring the color of the model, a gradation value of density for the droplets that is designated by the object data, such that a difference in density of colors to be reproduced by the first type and the second type droplet discharging units decreases, the adjustment unit multiplying the gradation value by a coefficient to convert the gradation value based on the measurement result; and
    a modeling unit that generates, from the object data and the gradation value that has been converted, cross sectional data that indicates a shape of a cross section of the object and color of the periphery of the cross section after the colorimetry unit causes the colorimeter to measure the color of the model to perform the colorimetry of the model, and models the object by repeating processing for discharging droplets from the plurality of droplet discharging units based on the cross sectional data and forming a plate-like structure for the object to newly form the plate-like structure for the object on a plate-like structure that has already been formed.

2. The three-dimensional modeling apparatus according to claim 1,
    wherein the adjustment unit adjusts, in a case where the same density is designated, at least one of a discharge ratio indicating a proportion of droplets to be discharged from the first type droplet discharging unit and a discharge ratio indicating a proportion of droplets that correspond to the droplets to be discharged from the first type droplet discharging unit and are to be discharged from the second type droplet discharging unit based on the gradation value that has been converted, such that a difference in density of colors to be reproduced by the first type and second type droplet discharging units decreases.

3. The three-dimensional modeling apparatus according to claim 1,
    wherein the modeling unit forms the plate-like structure having the shape of a cross section of the object, by discharging droplets from the plurality of droplet discharging units, based on the cross sectional, and
    forms and stacks a plurality of the plate-like structures by repeating processing for forming the plate-like structure, for a plurality of respectively different cross sections of the object that are aligned in a direction perpendicular to the cross section, and
    processing for forming the plate-like structure include:
    processing for forming a first structure portion including the periphery of the cross section by discharging droplets from the plurality of droplet discharging units in accordance with the adjustment, and
    processing for forming a second structure portion surrounded by the first portion of the cross section by discharging droplets that do not have the predetermined color from another plurality of droplet discharging units different from the plurality of droplet discharging units.

4. A method for modeling an object by discharging droplets, the method comprising the steps of:
    (a) forming a model by discharging droplets having a single predetermined color from a plurality of droplet discharging units based on the same reference signal;
    (b) causing a colorimeter to measure a color of the model to perform colorimetry of the model and specifying a first portion of the model and a second portion of the model that has the color with a higher density than the first portion;
    (c) adjusting at least one of the liquid amount of droplets per unit area to be discharged from, among the plurality of droplet discharging units, a first type droplet discharging unit that formed the first portion, and the liquid amount of droplets per unit area to be discharged from, among the plurality of droplet discharging units, a second type droplet discharging unit that formed the second portion, by converting, based on measurement result of measuring the color of the model, a gradation value of density for droplets discharged from a plurality of droplet discharging units, such that a difference in density of colors to be reproduced by the first type and the second type droplet discharging units decreases, the gradation value being a value designated by object data that indicates a shape and a color of the object, the gradation value being multiplied by a coefficient based on the measurement result to convert the gradation value; and (d) modeling the object after the forming of the model, the modeling of the object including
generating, from the object data and the gradation value that has been converted, cross sectional data that indicates a shape of a cross section of the object and color of the periphery of the cross section after the causing the colorimeter to measure the color of the model to perform the colorimetry of the model, and
repeating processing for discharging the droplets from a plurality of droplet discharging units based on the cross sectional data and forming a plate-like structure for the object to newly form the plate-like structure for the object on a plate-like structure that has already been formed.

5. The method according to claim 4,
wherein the step (c) includes the step of:
adjusting, in a case where the same density is designated, at least one of a discharge ratio indicating the proportion of droplets to be discharged from the first type droplet discharging unit and a discharge ratio indicating the proportion of droplets that correspond to the droplets to be discharged from the first type droplet discharging unit and are to be discharged from the second type droplet discharging unit based on the gradation value that has been converted, such that a difference in density of colors to be reproduced by the first type and second type droplet discharging units decreases.

6. The method according to claim 4,
wherein the step (d) includes the steps of:
(d1) forming the plate-like structure having the shape of the cross section of the object, by discharging droplets from the plurality of droplet discharging units, based on the cross sectional data; and
(d2) forming and stacking a plurality of the plate-like structures by repeating the step (d1) for a plurality of respectively different cross sections of the object that are aligned in a direction perpendicular to the cross section,
wherein the step (d1) includes the steps of:
forming a first structure portion including the periphery of the cross section by discharging droplets from the plurality of droplet discharging units in accordance with the adjustment according to the step (c); and
forming a second structure portion surrounded by the first portion of the cross section by discharging droplets that do not have the predetermined color from another plurality of droplet discharging units different from the plurality of droplet discharging units.

7. A non-transitory computer-readable medium storing a computer program for modeling an object by controlling a three-dimensional modeling apparatus using a computer and causing droplets to be discharged, the computer program causing the computer to realize:

a function of forming a model by discharging droplets having a single predetermined color from a plurality of droplet discharging units based on the same reference signal;
a function of causing a colorimeter to measure a color of the model to perform colorimetry of the model and specifying a first portion of the model and a second portion of the model that has the color with a higher density than the first portion;
a function of adjusting at least one of the liquid amount of droplets per unit area to be discharged from, among the plurality of droplet discharging units, a first type droplet discharging unit that formed the first portion, and the liquid amount of droplets per unit area to be discharged from, among the plurality of droplet discharging units, a second type droplet discharging unit that formed the second by converting, based on measurement result of measuring the color of the model, a gradation value of density for droplets discharged from a plurality of droplet discharging units, the gradation value being a value designated by object data that indicates a shape and a color of the object, the gradation value being multiplied by a coefficient based on the measurement result to convert the gradation value; and
a function of modeling the object after the function of the forming of the mode, the function of the modeling of the object including
generating, from the object data and the gradation value that has been converted, cross sectional data that indicates a shape of a cross section of the object and color of the periphery of the cross section after the function of the causing the colorimeter to measure the color of the model to perform the colorimetry of the model, and
repeating processing for discharging the droplets from a plurality of droplet discharging units based on the cross sectional data and forming a plate-like structure for the object to newly form the plate-like structure for the object on a plate-like structure that has already been formed.

8. The non-transitory computer-readable medium according to claim 7,
wherein, in a case where the same density is designated, at least one of a discharge ratio indicating the proportion of droplets to be discharged from the first type droplet discharging unit and a discharge ratio indicating the proportion of droplets that correspond to the droplets to be discharged from the first type droplet discharging unit and are to be discharged from the second type droplet discharging unit is adjusted based on the gradation value that has been converted, such that a difference in density of colors to be reproduced by the first type and second type droplet discharging units decreases.

* * * * *